US 6,751,027 B2

(12) United States Patent
Van Den Bossche et al.

(10) Patent No.: US 6,751,027 B2
(45) Date of Patent: Jun. 15, 2004

(54) PROJECTOR WITH SEALED INNER COMPARTMENT

(75) Inventors: Bart Van Den Bossche, Kuurne (BE); Krist Vandorpe, Beveren-Leie (BE); Geert Maes, Gullegem (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 09/923,085

(22) Filed: Aug. 6, 2001

(65) Prior Publication Data

US 2002/0033992 A1 Mar. 21, 2002

(30) Foreign Application Priority Data

Sep. 20, 2000 (EP) .............................................. 00203260

(51) Int. Cl.[7] ........................ G02B 27/14; G03B 21/26; G03B 21/16; G03B 21/14
(52) U.S. Cl. ........................... 359/634; 353/34; 353/37; 353/52; 353/119
(58) Field of Search ............................... 353/34, 37, 52, 353/57, 119; 348/335–339; 349/9; 359/634, 820

(56) References Cited

U.S. PATENT DOCUMENTS

| 5,170,194 | A | | 12/1992 | Kurematsu et al. ............ 353/52 |
|---|---|---|---|---|
| 5,648,860 | A | | 7/1997 | Ooi et al. ........................ 349/10 |
| 6,007,205 | A | * | 12/1999 | Fujimori ........................ 353/57 |
| 6,334,686 | B1 | * | 1/2002 | Shiraishi et al. ............... 353/57 |
| 6,350,033 | B1 | * | 2/2002 | Fujimori ........................ 353/61 |
| 6,416,183 | B1 | * | 7/2002 | Colpaert et al. ............... 353/46 |
| 6,428,170 | B1 | * | 8/2002 | Haba ............................ 353/119 |
| 6,450,646 | B1 | * | 9/2002 | Ono et al. ..................... 353/57 |

FOREIGN PATENT DOCUMENTS

EP 1193982 A1 * 3/2002 ............ H04N/9/31

\* cited by examiner

*Primary Examiner*—Ricky Mack
(74) *Attorney, Agent, or Firm*—Banes & Thornburg (57) ABSTRACT

A projector is provided which can handle high light intensities without dust or foreign matter penetrating the inside of the apparatus and thus deteriorating the quality of the image projected. The projector apparatus comprises a spatial light modulator (SLM) unit provided with a plurality of reflective SLMs and a prismatic light splitting/combining unit. The SLM unit is enclosed in a substantially sealed chamber. A heat path for cooling each SLM is provided, whereby the heat path connection is through the wall of the substantially sealed chamber. In this way, heat energy from the main heat source inside the sealed chamber is brought outside the sealed chamber for dissipation.

20 Claims, 6 Drawing Sheets

PROJECTOR WITH SEALED INNER COMPARTMENT

TECHNICAL FIELD OF THE INVENTION

The present invention relates to a spatial light modulator, an image projector apparatus using the modulator and method of operating the same which can handle high light intensities. More specifically, the present invention relates to a cooling mechanism for efficiently cooling the heat-emitting components of such a projection display apparatus.

BACKGROUND OF THE INVENTION

Large-screen, high-brightness (>1000 lumens) electronic projection display apparatuses serve different broad areas of application:

- electronic presentations for business, education, advertising,
- entertainment, e.g. home theater, electronic cinema.
- status and information, e.g. military, utilities, transportation,
- simulation in e.g. training and games.

Recently, in response to various limitations of the LCD technologies, high-brightness systems have been developed based on digital light processing (DLP) technology. At the heart of a DLP projection display is provided a spatial light modulator (SLM) unit. A spatial light modulator unit comprises at least one spatial light modulator, which is a device that modulates incident light in a spatial pattern corresponding to an electrical or optical input. The incident light may be modulated in its phase, intensity, polarisation, or direction, and the light modulation may be achieved by a variety of materials exhibiting various electro-optic or magneto-optic effects or by materials that modulate light by surface deformation. An SLM consists of a one- or two-dimensional array of light-modulating elements. Silicon technology used in projection data monitors is capable of producing small-sized, two-dimensional light-valve arrays having several hundred thousand to several million light-modulating elements.

Spatial light modulators are either transmissive or reflective. Transmissive devices modulate the light beam as it passes through the unit. Reflective devices modulate the light as it reflects from a mirror inside the unit.

A deformable mirror device (DMD), also called digital mirror device or digital micro-mirror device, is one embodiment of a reflective SLM, see for example U.S. Pat. No. 5,061,049. It is a semiconductor-based array of fast, reflective digital light switches that precisely control reflection of a light source using, for example, a binary pulse width modulation technique. Combined with image processing, memory, a light source, and optics it forms a DLP system capable of projecting large, bright, seamless, high-contrast color images. A DMD has a matrix of a plurality of individually electrically deformable or moveable mirror cells. In a first state or position, each mirror cell of the deformable mirror device acts as a plane mirror to reflect the light received to one direction (through a lens towards a projection screen for example), while in a second state or position they project the light received to another direction (away from the projection screen).

Reflective spatial light modulators, such as DMDs or reflective LCDs, are heat sensitive, and a hot DMD results a decrease of lifetime and/or in discoloration of the projected image.

A cooling mechanism for cooling the internal parts of a projection display apparatus, is generally built in into it. In general, outside air is introduced into the projector apparatus through an intake opening using an intake fan, and flows over the internal heat-emitting components to cool them. After cooling each of these parts, the air is vented by an exhaust fan to the ambient environment from an air vent opening in an outside case of the projector apparatus. Only one fan can be used for both intake and exhaust.

When air is introduced from outside the apparatus, dust and other foreign matter, such as smoke, oil, may penetrate to the inside of the apparatus. An air filter is generally placed over the intake opening to capture dust and filter the air, but it is still possible for fine particles to penetrate to the inside of the apparatus. When such particles enter the inside of the apparatus with the outside air, they may adhere to the surface of the optical elements. When particulate matter thus adheres to a DMD, it causes decreased light output, or it may hinder the individual mirrors in their movements, resulting in severely deteriorated image quality. A known solution to this problem is to disassemble the projector apparatus and replace the DMOs, as the spaces around a DMD are usually very small, and it is very difficult to clean a DMD in its mounted position.

There has been a long felt need to cool the heat-emitting parts inside the projector apparatus in a way that prevents particulate contamination.

U.S. Pat. No. 6,007,205 describes an LCD projector with an optical lens unit comprising transmission LCD's and other light transmitting heat-emitting components, such as polarising plates. The optical lens unit is enclosed in a substantially airtight internal chamber. A circulating air current is created by force, by means of a circulation fan, inside this chamber, which cools the heat-emitting components. Preferably means are provided for introducing outside air and for directing the outside air around the outside surface of the members separating the substantially airtight chamber. A heat exchange action between the circulating air current created in the airtight chamber and the outside air flowing through the intake air path is thereby accomplished. In this way, the projector is provided with a cooling mechanism such that no dust or foreign matter penetrates to the inside the optical lens unit.

The LCD projector described has a limited ability to operate at high light intensities. It is difficult to implement effective cooling of the optical components at the highest brightness levels. Particularly for LCD's which operate as light valves, i.e. they either pass or absorb light, the absorbence of light energy in the LCD for those parts of the projected image which are dark results in large amounts of light energy being absorbed within the sealed chamber (e.g. in the polariser). It is difficult to remove this heat energy by forced convection cooling inside a sealed chamber which relies on an inefficient air-to-air heat exchanger to remove the heat from the sealed chamber and delivery it to an outer chamber.

U.S. Pat. No. 5,170,195 describes methods of cooling transmission LCD's. These methods involve placing cooling liquid in the light path. It is difficult to guarantee perfect optical clarity of a cooling liquid over the life of a projector. Also, the cooling liquid absorbs some of the transmitted light which reduces the transmitted light intensity and increases the load on the cooling circuit of the LCD. The density of the cooling liquid can change polarisation direction of the light thus causing discolorations of the projected image.

SUMMARY OF THE INVENTION

It is an object of the present invention to provide an SLM unit, a projector apparatus and a method of operating the same which can handle high light intensities, without dust or foreign matter penetrating to the sensitive optical components inside of the apparatus and thus deteriorating the quality of the image projected.

According to the present invention, there is provided a spatial light modulating unit for a projector apparatus wherein the spatial light modulating unit is provided with a plurality of SLMs (Spatial Light Modulators, for example, one for each color) and a light splitting unit such as a prismatic device for splitting white light into color components. The spatial light modulating unit also has means for combining the light reflected from the SLMs for projection. This combining device can be the same prismatic unit as used for light splitting. The spatial light modulation unit is enclosed by a substantially sealed chamber. A cooling connection is provided for each SLM, whereby the cooling connection passes through the wall of the substantially sealed chamber and makes contact with each SLM in a heat conductive manner. In this way heat from the main heat sources within the sealed chamber is brought outside the sealed chamber for more efficient cooling, e.g. by an array of fins and a forced convection cooling system. Each SLM is preferably a reflective SLM, such as a DMD or a reflective LCD. With a reflective SLM, the path of light color components of the white light incident on the SLM are preferably remote or distal from the cooling connection for the SLM. Hence, the light needed for projection does not pass through the cooling connection. Particularly preferred are mirror deflection devices such as DMDs which can reflect black light energy out of the chamber. "Black light" is the difference in light between incident light and the light to be projected, i.e. it is the light energy which must be removed from the incident beam as it is not used for projection of the image on the screen, for instance in parts of the image which need not be illuminated. Preferably, each reflective SLM is located opposite a different face of a prism or prisms which is used to separate white light into component colors. One component of color separated light exits each different face of the prism before it strikes the reflective SLM.

Preferably, the light splitting unit is located substantially centrally in the sealed chamber and the plurality of reflective SLMs are arranged radially about the central light splitting unit, each heat path connection transferring heat in a starting linear direction substantially the same as the direction of light incident on each reflective SLM.

Preferably a forced convective cooling means for cooling the light splitting unit is provided inside the substantially sealed chamber, for example a circulation fan or blower for moving the gas in the sealed chamber. The sealed chamber is usually filled with air at atmospheric pressure. A very uniform temperature of a prism or prisms is desirable in order to have a good image quality.

Additionally, means for additional cooling of the SLMs may be connected to the heat path connection at the outside of the substantially sealed chamber. These means may be, for example, a heatsink, a Peltier element, other electrical cooling means or any other cooling means such as water cooling.

According to another embodiment, means are provided for removing "black light" out of the substantially sealed chamber so that heat energy within the black light is absorbed outside the sealed chamber.

The present invention also provides a method of cooling a projector apparatus having a spatial light modulating unit provided with a plurality of spatial light modulators (SLMs) and a light splitting unit for splitting white light into color components, the spatial light modulating unit being enclosed by a substantially sealed chamber having walls, the method comprising the step of: cooling each SLM via a heat path connection through a wall of the sealed chamber, the heat path connection being heat conductively connected to each SLM. The heat connection may be passive and comprise a heat conductive connection, for example, massive metal or may be an active cooling system such as forced liquid or gas cooling, heat pipes.

Other features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

In the different figures, the same reference figures refer to the same or analogous elements.

DESCRIPTION OF THE ILLUSTRATIVE EMBODIMENTS

The present invention will be described with respect to particular embodiments and with reference to the drawings attached, but the invention is not limited thereto but only by the claims. The drawings described are only schematic and are non-limiting. The description of the present invention will refer to DMDs but the invention is not limited thereto. For instance, other reflective SLMs such as reflective LCD's are also included.

Figure 1:
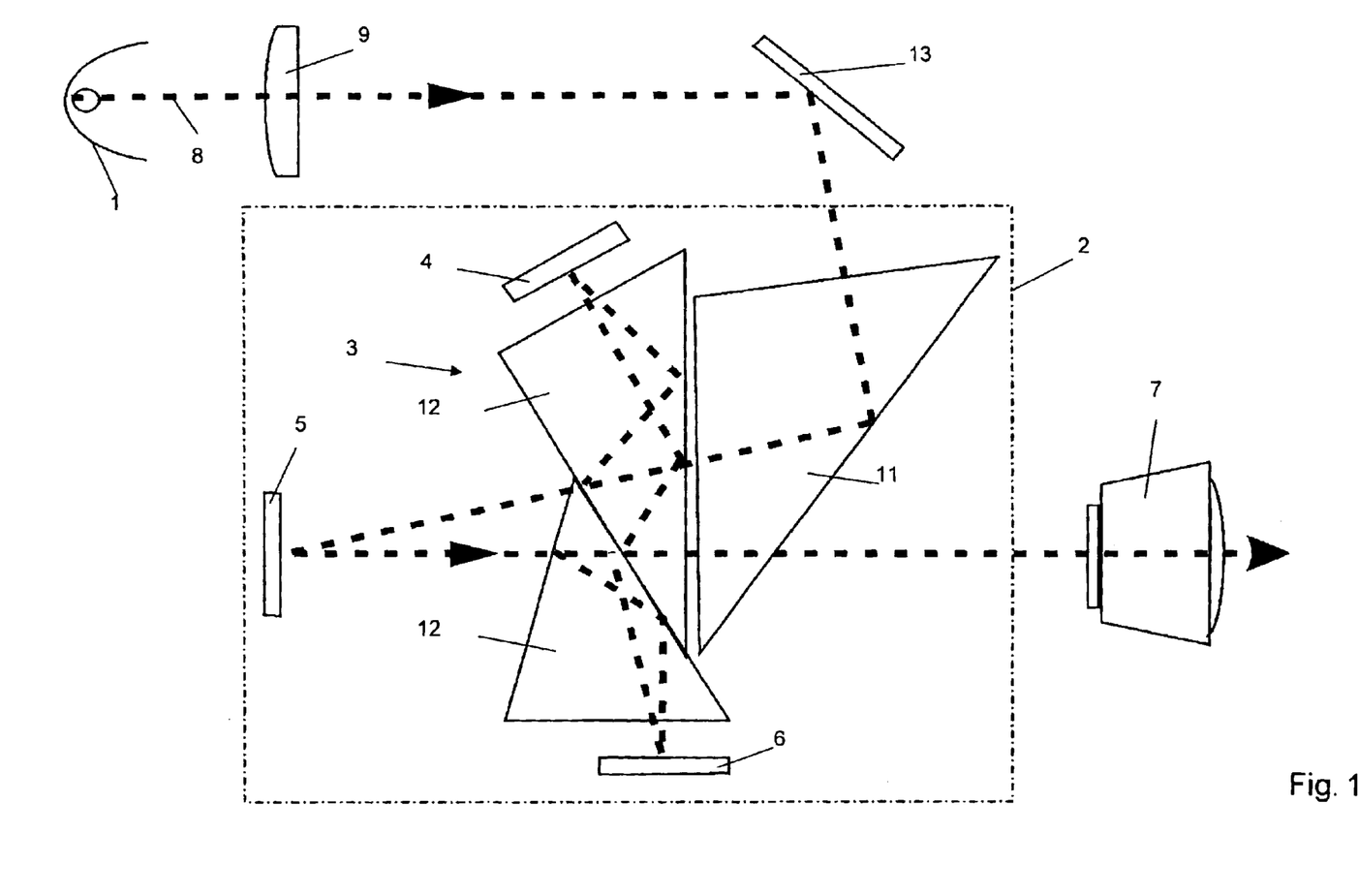
FIG. 1 is a schematic view of the main parts of a projector apparatus provided with three reflective SLMs in accordance with an embodiment of the present invention.

FIG. 1 is a schematic view of the main parts of a projector apparatus provided with 3 reflective SLMs in accordance with an embodiment of the present invention. The projector apparatus comprises a white light source 1, a sealed SLM unit 2 comprising a light color component splitting/combining device, e.g. a prismatic unit 3 comprising one or more prisms, and a plurality of reflective SLMs, e.g. DMDs 4, 5, 6 (each controlling one color to be projected by the projector apparatus on a display screen —DMD 4 for blue, DMD 5 for green and DMD 6 for red), and a projection lens 7. The prismatic unit 3 in the SLM unit 2 may comprise a total internal reflection (TIR) prism 11 and color-splitting/color-combining prisms 12. Because a DMD is an array of reflective light switches, no light absorbing polarisers are required. From FIG. 1 it can be seen that the DMDs 4, 5, 6 are mounted at the exit sides of the prismatic unit 3 with respect to the light from source 1.

Light 8 from the light source 1, for example, a metal halide or xenon lamp, is collected by a condenser lens 9 for obtaining a uniform illumination. For proper operation of the DMD light switch, this light is preferably directed at about 20 degrees relative to the normal of the DMD chip. To accomplish this in a method that eliminates mechanical interference between the illuminating and projecting optics, a mirror 13 and a total internal reflection prism 11 are interposed between the projection lens 7 and the DMD color-splitting/color-combining prisms 12.

The color-splitting/color-combining prisms 12 may have dichroic interference filters deposited on their surfaces to split the light by reflection and transmission into a plurality of color components, e.g. red, green and blue components. With this type of red and blue light generating prisms, an additional reflection from a TIR surface of the prism is required in order to direct the light at the correct angle to the red and blue DMDs. Light reflected from the on-state mirrors of the three DMDs is directed back through the prisms and the color components are combined. The combined light then passes through the TIR prism and into the projection lens 7 because its angle has been reduced below the critical angle for total internal reflection in the prism air gap.

Figure 2:
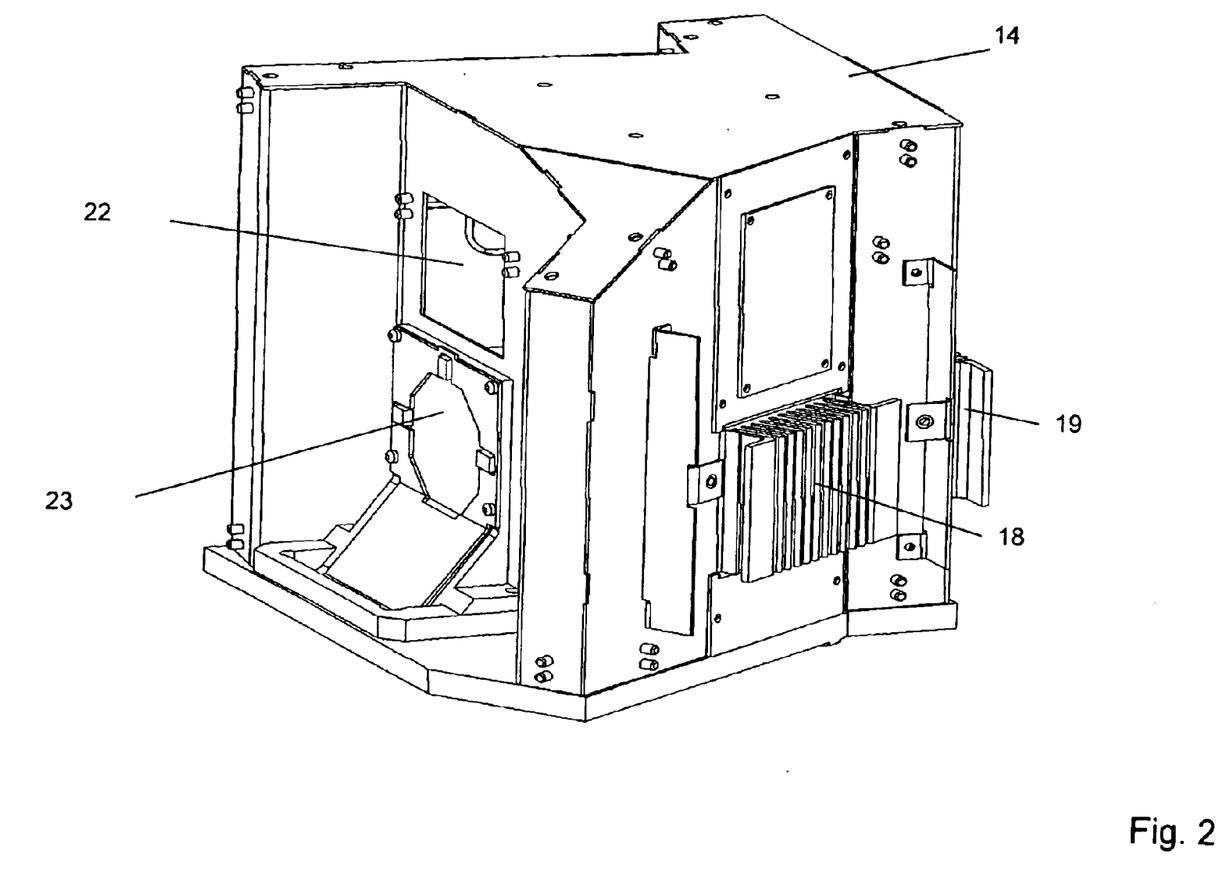
FIG. 2 is a perspective view of a substantially sealed chamber according to an embodiment of the present invention.
Figure 3:
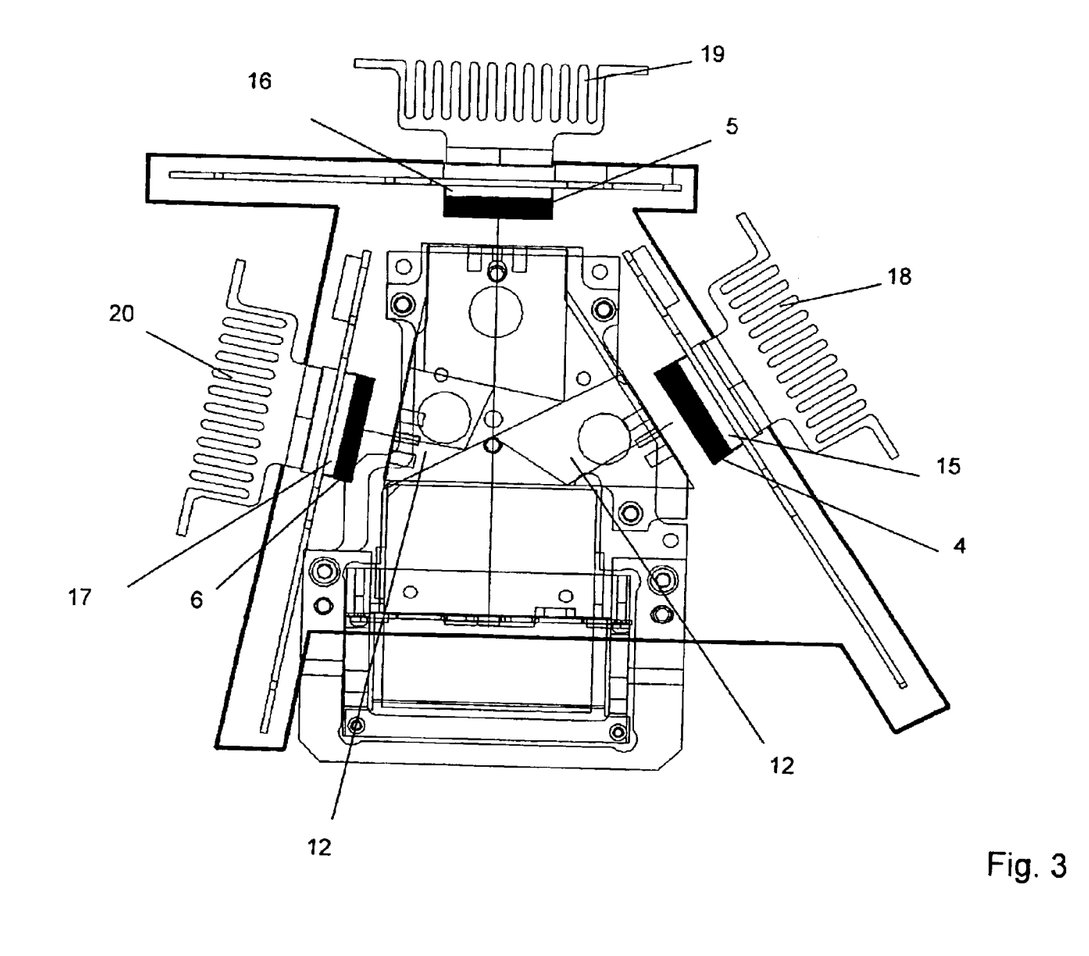
FIG. 3 is a cross-sectional view of the substantially sealed chamber of FIG. 2.

According to this embodiment of the present invention, the SLM unit 2 is enclosed in a substantially sealed chamber 14, as represented in FIGS. 2 and 3. With "substantially sealed" is meant that it is sealed from the ambient air so that no significant quantities of dust or smoke particles can enter the chamber 14, but there is not necessarily any difference in pressure between the internal space of the sealed chamber 14 and the ambient air. The substantially sealed chamber 14 can be an atmospheric system, that it is not necessarily pressure sealed and may be filled with a gas such as air. Incoming white light is split into its color components inside the substantially sealed chamber 14 and the color components modulated to project an image from the sealed chamber towards a projection screen.

As DMDs 4, 5, 6 are heat sensitive, and hot spots on the prismatic unit 3 can cause discoloration of the projected image, the DMDs 4, 5, 6 are cooled. Preferably, the DMDs are cooled separately from the cooling for the prismatic unit 3. A heat path connection 15, 16, 17 in intimate heat conductive contact with each DMD 4,5,6 is provided which channels heat from the DMDs through the walls of the sealed chamber 14 for cooling each DMD 4, 5, 6 Heat from the DMDs 4, 5, 6 is taken out of the sealed chamber by means of these heat path connections 15, 16, 17. Each heat path connection 15, 16, 17 is heat conductively connected to each DMD 4, 5, 6 (rather than being convectively coupled to each DMD). Preferably, each DMD has a major planar surface and the heat connection path is conductively connected to this major surface. As shown in FIG. 3, each heat path connection 15, 16, 17 is made of a heat conductive material forming the heat conductive path. A suitable material is a highly heat conductive metal such as copper or aluminum. Conductive heat paths transfer molecular kinetic energy between solids. The DMDs are cooled substantially only via these heat path connections 15–17. In particular the heat path connections 15–17 in accordance with the present invention should transport heat energy generated in the SLMs 4–666 or in associated electronic components away from the prismatic unit 3 to reduce the cooling load on the cooling system of the prismatic unit 3.

In accordance with a further embodiment of the present invention each SLM has at least one major planar surface and this major surface of each SLM is connected directly in a heat conductive way to a wall of the sealed chamber. Preferably, the wall is made of a highly heat conductive material such as copper or aluminum.

At the outside of the substantially sealed chamber 14, means for cooling the DMDs 4, 5, 6 may be attached to the heat path connections 15, 16, 17. These means may be passive cooling elements. As represented in FIG. 3, conventional heatsinks 18, 19, 20 are provided. The cooling elements are preferably highly heat conductive elements, e.g. massive aluminum, copper or other metal parts with a large number of fins and/or protrusions. The most common form in which the protrusions can be found is a series of rows and columns of thin rectangular cooling fins. These heatsinks are exposed to air outside the sealed chamber 14. The greater the surface area of the heatsinks 18, 19, 20 exposed to the air, the greater the dissipation of heat for a given quantity of metal. Heat is dissipated from the heatsinks 18, 19, 20 into the air surrounding them by convection, e.g. forced air convection.

In another embodiment, the cooling means may be additionally or alternatively an active cooling element, e.g. a Peltier cooler element. A Peltier cooling element makes use of the Peltier effect, and can be described as a "heat pump": it will pump heat from one side of itself to the other using electrical energy. Each Peltier element may be provided between the heatsinks 18–20 and the respective heat path connection 15–17 and is preferably located outside the sealed chamber.

Alternatively, other active cooling elements may be provided, e.g. those using a circulated cooling fluid such as a gas or a liquid. For example, heat sinks 18–20 may have internal channels for circulation of a cooling fluid such as water.

In an additional embodiment in accordance with the present invention, the cooling fluid of an active cooling system is fed through the wall of the sealed chamber in suitable pipes, channels or conduits to the back of each SLM device (the side remote from the prismatic unit 3). Here, the forced cooling fluid system is connected to each SLM heat conductively, e.g. a plate is fixed to the back of each SLM and the cooling fluid is forced to flow against this plate before returning through suitable pipes, channels or conduits to the space outside the sealed chamber. The cooling system may also be comprised of heat pipes which pass through the wall of the sealed chamber. The cooling fluid may be a gas or a liquid.

Figure 5:
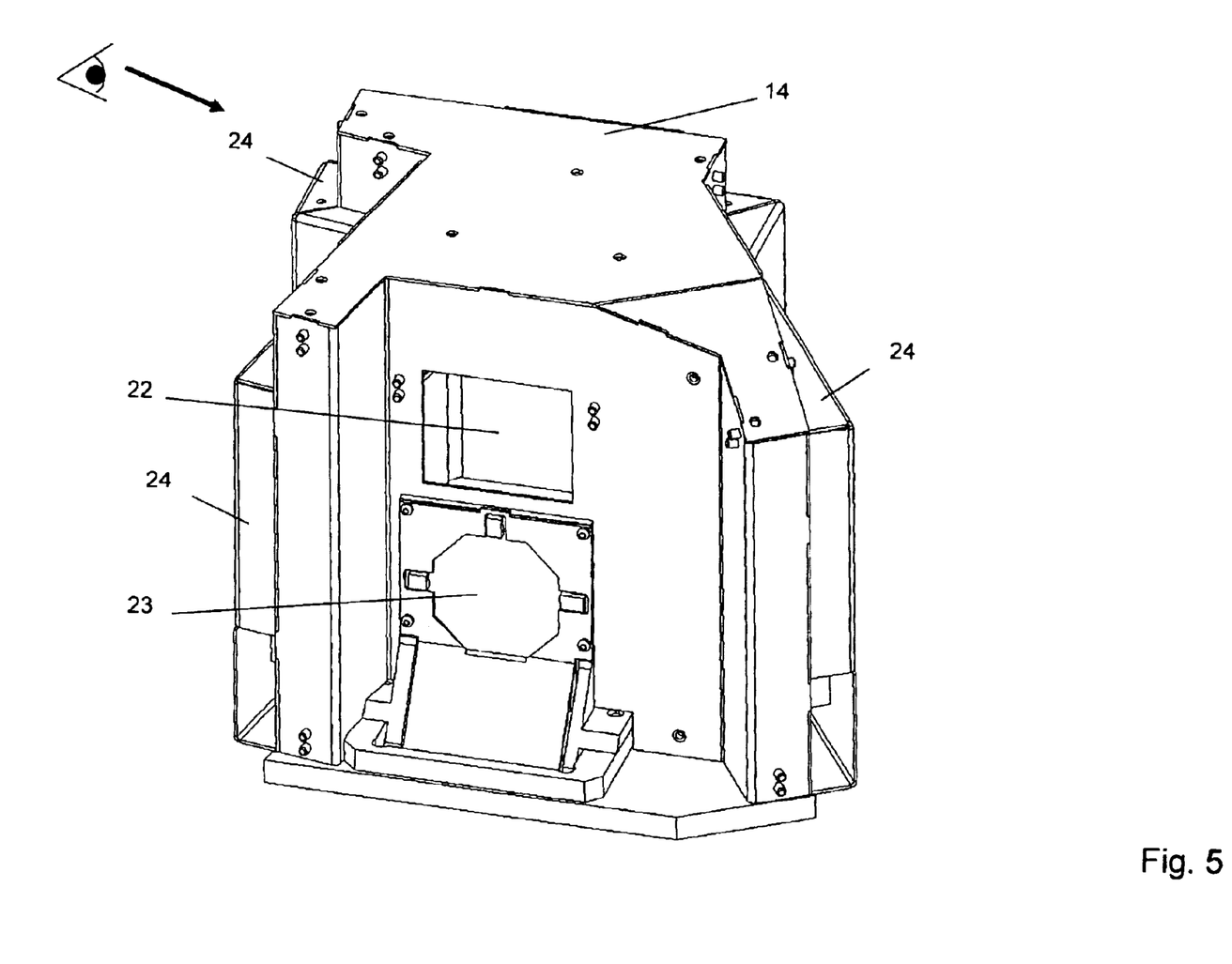
FIG. 5 is a perspective front view of the substantially sealed chamber of FIG. 2, surrounded by cooling chambers.
Figure 6:
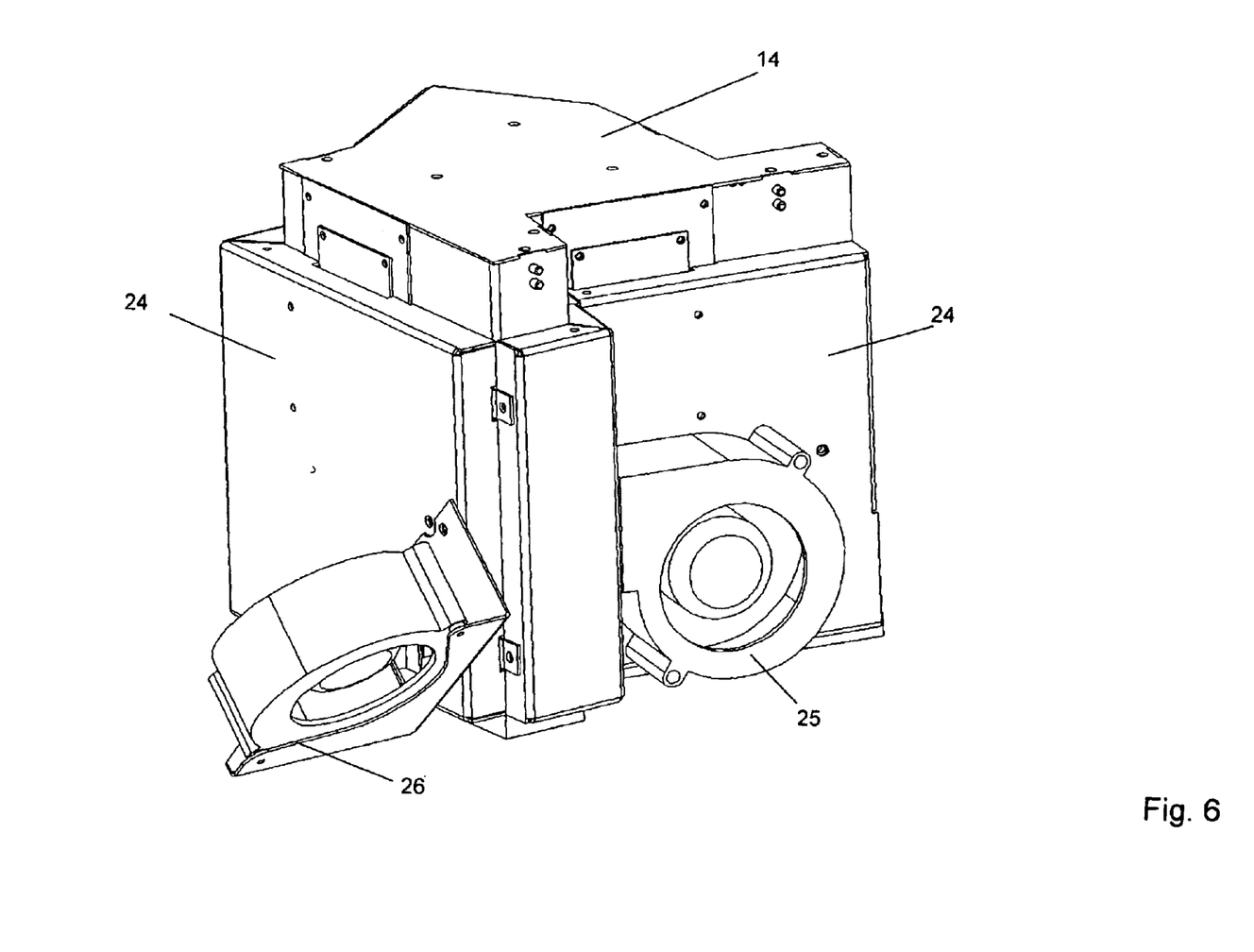
FIG. 6 is a perspective view of the embodiment of FIG. 5, looked at from the direction of the eye in FIG. 5.

Each of the cooling means for conductive cooling of the DMDs 4, 5, 6, can be cooled itself. Preferably, and as represented in FIGS. 5 and 6, the substantially sealed chamber 14 is surrounded by at least one additional chamber 24 provided with means 25, 26 for circulating the air inside the cooling chambers 24 and for providing forced convective cooling for heat sinks 18–20. The red color DMD 6 often generates the most heat, therefore one fan or blower 25 may be provided for cooling the heatsink 20 on the red DMD, and one fan 26 is provided for cooling both the heatsinks 18 and 19 on the blue and green DMDs 4, 5 respectively, but the present invention is not limited thereto. Separate fans may be provided for cooling each of the heatsinks 18, 19, 20, or one fan for cooling all the heatsinks 18, 19, 20.

As best shown in FIG. 3, the prismatic unit 3 is located centrally in the sealed chamber 14 with a plurality of reflective SLMs 4–6 arranged radially about the central prismatic unit 3. Each reflective SLM 4–6 has a planar structure for receiving light from the prismatic unit 3. At the side of the planar structure remote from the prismatic unit 3, heat path connections 15–17 are arranged which remove heat from the SLMs 4–6 in a direction substantially the same as the direction of the light incident on the SLMs. In this way the heat path connections 15–17 are remote or distal from the light path incident on the SLMs 4–6. Thus no useable light passes through a part of the heat path connections 15–17. Further, the location of the SLMs 4–6 radially distant from a central prismatic unit 3 allows placement of the walls of the sealed chamber close to the SLMs 4–6 thus reducing the distance from each SLM to the wall of the chamber 14 and hence reducing the thermal resistance between each SLM and a cooling system outside the sealed chamber. This radially remote siting of the SLMs 4–6 combined with radially directed heat path connections 15–17 also takes the heat away from the central prismatic unit 3. Thus forced convective cooling of the central prismatic unit 3 is sufficient to keep this cool even at high light intensities.

Where SLMs 4–6 are DMDs, incident light on a DMD is reflected along one of two paths. Along the first path the light is combined with light reflected from the other SLMs and is projected. Along the second path the light is not projected but is preferably guided out of the sealed chamber 14 where it is absorbed outside the sealed chamber 14. The prismatic unit 3 provides one or more of the following functions:

splitting the white light into color components, combining the color components reflected from the DMDs and forms part of the mechanism for transmitting black light out of sealed chamber 14 along with a first window 22 in the sealed chamber 14.

Preferably, the prismatic unit carries out all three functions.

Figure 4:
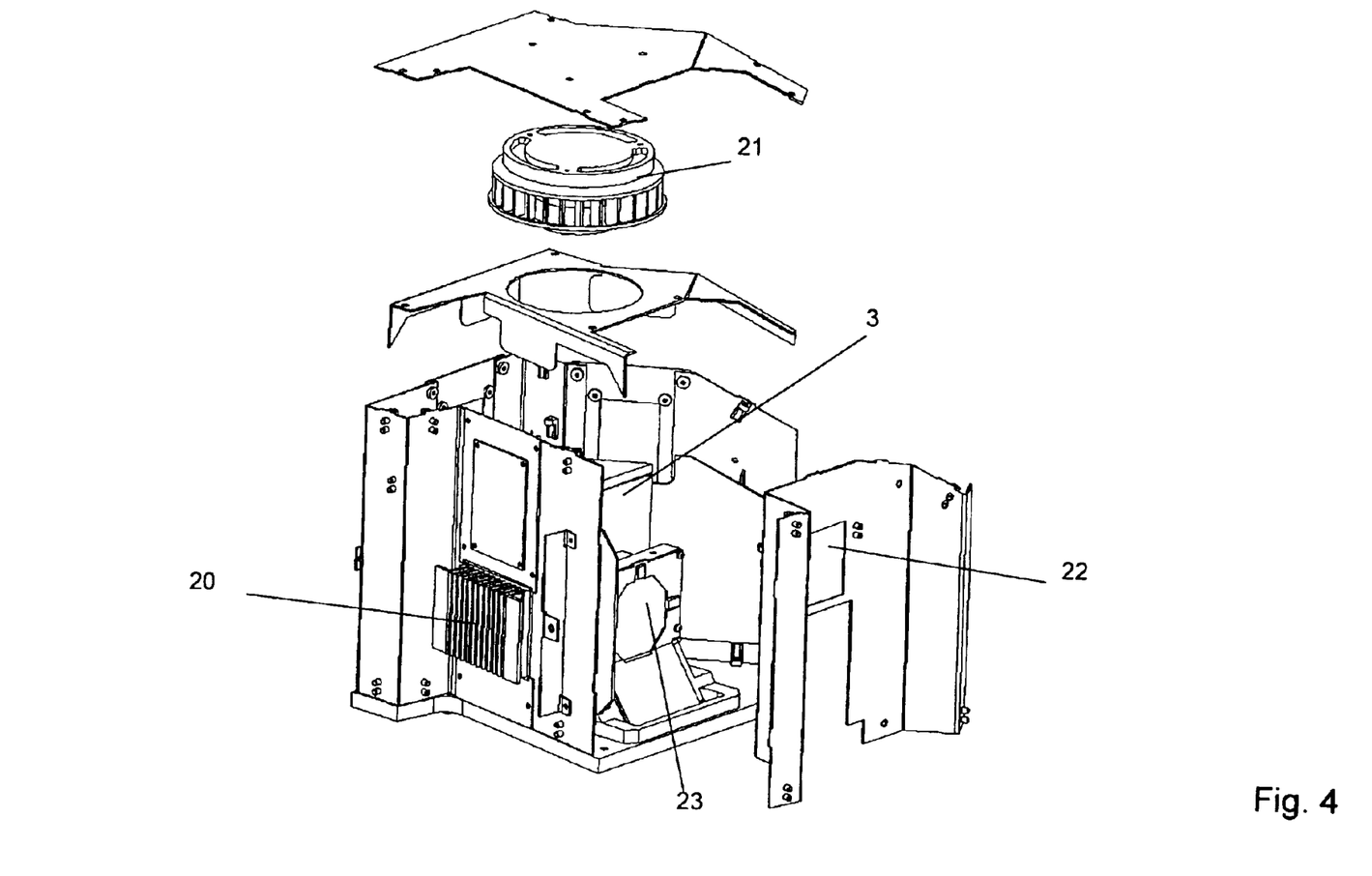
FIG. 4 is an exploded view of the substantially sealed chamber of FIG. 2.

In the embodiment described, and as can be seen in the exploded view of FIG. 4, a circulation fan 21 is provided in the substantially sealed chamber 14 for cooling the prismatic unit 3. This circulation fan 21 is located substantially in the middle above the prismatic unit 3. The prismatic unit 3 is cooled substantially only via a forced convection path.

As explained above, the DMDs 4, 5, 6 either send light towards the projection lens 7, or dissipate the light elsewhere. In the embodiment described, a black body (not represented) may be located outside the sealed chamber 14 for absorbing unwanted light directed towards it. This black body receives unused light energy, and blocks it and allows transfer of this light energy to a further cooling system outside the sealed chamber 14. The light is sent towards the black body through the first window 22 in the substantially sealed chamber 14 thus absorbing the black light outside the sealed chamber. The polariser of a reflective LCD will absorb light and if this polariser is inside the sealed chamber this heat loss can be considerable (e.g. black light). A conductive heat path connection is connected to the rear of a reflective LCD to actively cool the LCD by conduction.

The substantially sealed chamber 14 is also provided with a second window 23 for output of the light towards the projection lens 7. It is furthermore provided with a third window (not represented) which, in the embodiment shown in FIGS. 2 to 4, is located at the bottom of the substantially sealed chamber 14, and which serves for entrance of the light 8 coming from the light source. All these windows are easy to clean, for example with a simple cloth, without having to disassemble the whole projector apparatus. In front of the third window, an UV and/or IR filter may be placed, so that the light entering the substantially sealed chamber 14 is as cold as possible.

Flat cables and single wired cables may used for making electrical connections inside the substantially sealed chamber 14, so that no dust enters the substantially sealed chamber 14 through the cables. Such electrical connections are for example the connection of the DMDs to the respective video signal processing circuits (not represented), which circuits convert an incoming video signal (video data) to a signal for steering each mirror of each DMD for obtaining the right image on the display (i.e. for causing the mirrors to reflect light towards the projection lens 7 or in an other direction). The "on" state of a mirror appears bright on the projected and the "off" state of a mirror appears dark.

In another embodiment, printed circuit boards (PCB's) for signal processing and driving the SLMs 4–6 may be placed inside the substantially sealed chamber 14, or may form one or more walls of the substantially sealed chamber.

As a safety measurement temperature measuring means (not represented) can be provided inside the substantially sealed chamber 14, which are connected with control means (not represented). If the temperature measured inside the substantially sealed chamber 14 is higher than a pre-set temperature, suitable action is taken, e.g. the projector apparatus is shut off, the light intensity is reduced or the cooling systems inside the sealed chamber 14 may be operated in a higher cooling rate mode.

While the invention has been shown and described with reference to preferred embodiments, it will be understood by those skilled in the art that various changes or modifications in form and detail may be made without departing from the scope and spirit of this invention.

What is claimed is:

1. A spatial light modulating unit provided with a light splitting unit for separating white light into a plurality of light color components and a plurality of reflective spatial light modulators for modulating the light color components, the spatial light modulating unit being enclosed by a substantially sealed chamber having walls; comprising: a cooling system for cooling each reflective spatial light modulator, the cooling system providing a heat path connection through a wall of the sealed chamber for cooling each reflective spatial light modulator, the cooling system being conductively connected to each reflective spatial light modulator through the wall of the sealed chamber.

2. The spatial light modulating unit according to claim 1, wherein each path of the light color component to the reflective spatial light modulators is distal from the corresponding heat path connection.

3. The spatial light modulating unit according to claim 1, wherein the heat path connection is a passive cooling system.

4. The spatial light modulating unit according to claim 3, wherein the heat path connection is formed from heat conductive material.

5. The spatial light modulating unit according to claim 1, further comprising a forced convective cooling means for cooling the light splitting unit inside the substantially sealed chamber.

6. The spatial light modulating unit according to claim 1, further adapted to remove black light out of the substantially sealed chamber.

7. The spatial light modulating unit according to claim 1, wherein a heatsink is connected to the heat path connection at the outside of the substantially sealed chamber.

8. The spatial light modulating unit according to claim 1, wherein the heat path connection is a active cooling system.

9. The spatial light modulating unit according to claim 8, wherein a Peltier junction cooling element is connected to the heat path connection of the substantially sealed chamber.

10. The spatial light modulating unit according to claim 1, wherein each reflective spatial light modulator is a reflective LCD.

11. The spatial light modulating unit according to claim 1, wherein each reflective spatial light modulator is a controllable mirror reflection device.

12. The spatial light modulating unit according to claim 11, wherein the reflective spatial light modulator is a DMD.

13. The spatial light modulating unit according to claim 1, wherein the light splitting unit is a prismatic device.

14. The spatial light modulating unit according to claim 1, wherein the light splitting unit is located substantially centrally in the sealed chamber and the plurality of reflective spatial light modulators are arranged about the central light splitting unit between the light splitting unit and a wall of the sealed chamber, each heat path connection transferring heat in a starting direction substantially the same as the direction of light incident on each reflective spatial light modulator.

15. A projector apparatus having a spatial light modulating unit according to claim 1.

16. A method of cooling a projector apparatus having a spatial light modulating unit provided with a plurality of reflective spatial light modulators, and a light splitting unit for splitting white light into component colors, the spatial light modulating unit being enclosed by a substantially sealed chamber having wall, the method comprising the step of:

cooling each reflective spatial light modulator via a heat path connection through a wall of the sealed chamber, the heat path connection being heat conductively connected to each reflective spatial light modulator through the wall of the sealed chamber.

17. The method according to claim 16, wherein the heat path connection is a passive cooling system.

18. The method according t claim 16, further comprising the step of forced convective cooling the light splitting unit inside the substantially sealed chamber.

19. The method according to claim 16, further comprising the step of removing black light out of the substantially sealed chamber.

20. The method according to claim 16, wherein the heat path connection is an active cooling system.

* * * * *